Aug. 13, 1946.  H. T. BOGLE  2,405,556
AIRCRAFT LANDING NET
Filed Dec. 2, 1942
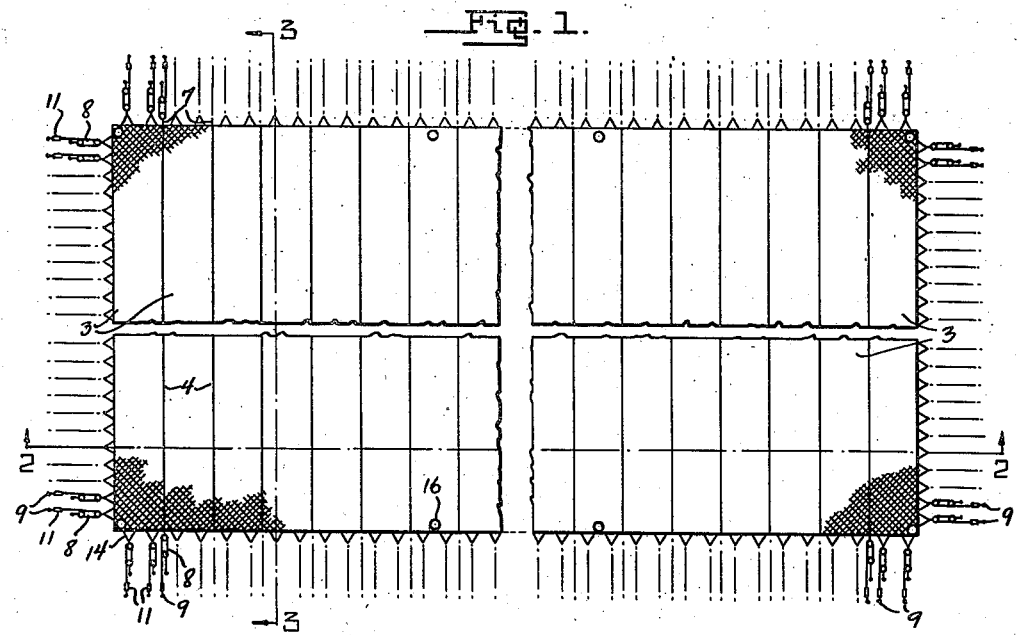
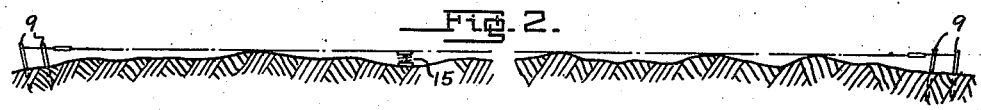
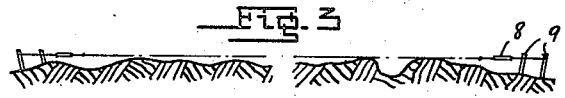
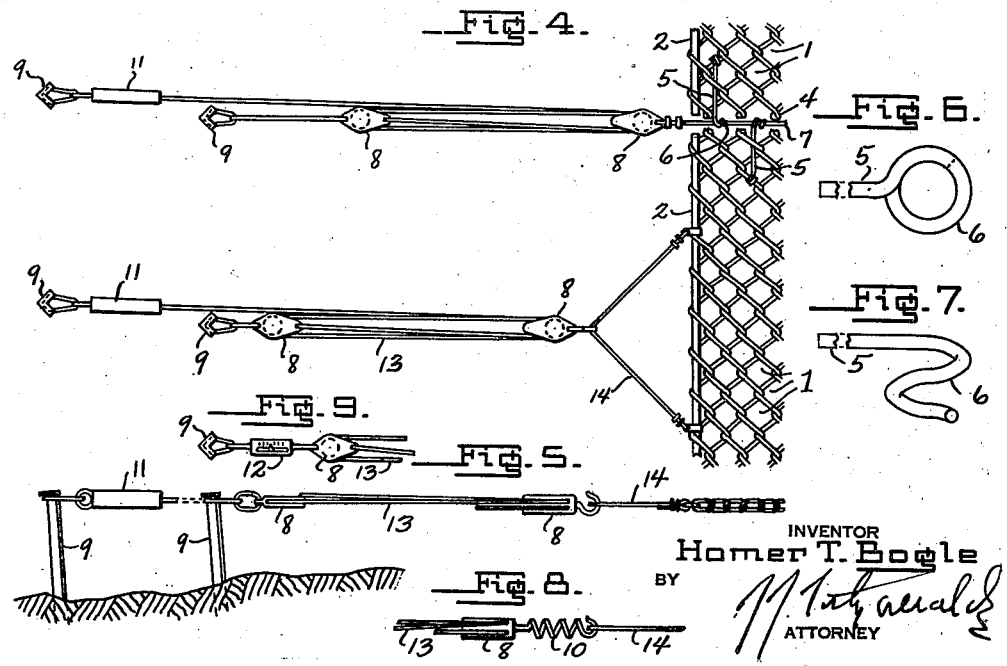
INVENTOR
Homer T. Bogle
BY
ATTORNEY Patented Aug. 13, 1946

2,405,556

UNITED STATES PATENT OFFICE 2,405,556

AIRCRAFT LANDING NET

Homer T. Bogle, United States Navy

Application December 2, 1942, Serial No. 467,663

9 Claims. (Cl. 94—13)

(Granted under the act of March 3, 1883, as amended April 30, 1928; 370 O. G. 757)

The present invention relates to improvements in aircraft landing nets for use in providing suitable landing strips over unprepared fields.

The object of the devices disclosed herein is to provide an improved landing net which will be practicable in service, light in weight, easily assembled, disassembled and transported to new fields for immediate use particularly in strange territory over rough or soft terrain, thus avoiding the necessity of long delay and great expense of effort in preparing the ground for a suitable runway, in territory that has no natural or ready-made landing fields. The purpose of this net is to provide a safe area for landing and take-off for all types of aircraft by providing a suspended, stretched, metallic net laid over the landing field as a landing strip. The important features of these devices are the compactness into which the net can be rolled for transportation, the ease and facility with which the net can be handled, laid in place, maintained and retrieved; and the relatively small amount of site preparation, machinery, facilities, land preparation and length of time necessary to establish a permanent and satisfactory landing area.

Other and more specific objects will become apparent from the following detailed description of the construction of the landing net and its several parts, taken in conjunction with the accompanying drawing, in which:

Fig. 1 is a plan view of one end portion of the landing net and its moorings,

Fig. 2 is a section taken along the line 2—2 of Fig. 1,

Fig. 3 is a section taken along the line 3—3 of Fig. 1,

Fig. 4 is a detail view of a portion of one side of the net showing the assembly of the sections making up the landing strip, Fig. 5 is a side view of one of the mooring attachments, and Figs. 6 and 7 are side and plan views of the free ends of the hooks whereby the sections are joined together by means of the common link wires passed through their loops, Figs. 8 and 9 are details of auxiliary equipment that may be used, if desired.

In practice maneuvers or in an actual theatre of war it is often necessary to establish a landing field in territory having no natural level spaces suitable for that purpose. Sometimes a considerable amount of work and material is necessary to prepare a strip of ground for a runway. The labor or material is not always available; nor is it sometimes desirable to wait for any extensive preparations even if the men and material are available. To meet such emergencies the herein disclosed equipment will be found to be essential, particularly in time of war in hostile territory.

One form of the present invention is shown in the drawing. The landing strip is composed of a series of net sections 3 fastened together at the long edges 4 by means of hooks 5 with loops 6 through which the common link wires 7 are laced and stretched by means of the block and tackle connections 8 connected to anchors 9. Each net section consists of metal lozenge squares 1 of standard sizes, wire mesh or chain links, suspended and held in place by tie-rods, reinforcements, anchors or similar means along the edges, at high points and at varying distances throughout the length of the net. This forms a net that suppresses the static and dynamic loads which ordinarily cause failures in conventional landing strip areas.

The "net" method of providing a landing strip will eliminate the soil tests, grading, and other preparations of an engineering nature, heretofore necessary for temporary landing fields. The net, suspended over a field area and touching only the high points of the landing strip, will act as a cushion and give the effect of leveling or smoothing out the contour of the ground for aircraft in motion on the field or upon landing. The take-off will be accelerated by the slight wave action of the net, imparting a partial catapulting action to airplanes when approaching airbourne speed and therefore permitting the use of shorter runways. Likewise, arresting gear may be used in the approach section of the net, thereby permitting the use of shorter landing strips.

The net itself is flexible to allow kinetic energy to be absorbed by means of the mesh or chain link design, which, due to the reflex action of the net, will yield and then regain its original shape and position when acted upon by the dynamic forces imparted by the plane in motion. The net, therefore, dissipates the momentum of the moving or landing aircraft by absorbing the energy in the net, over a large area and in all directions, by acting, in effect, through a lever arm provided by the design, structural, and installation characteristics of the suspended net.

Further resiliency, if desired, may be provided by inserting spring or other shock absorber devices 10 between the pulley and cable stretcher as shown in Fig. 8, to augment the momentum absorbing characteristics of the net. 11 is a turn buckle, U bolt or ratchet device for pulling up on the corresponding block and tackle 8. The type of stake, deadman or other anchorage means will depend on the condition of the soil encountered. The block and tackle may be equipped with "strain gauges" or other tension measuring devices as shown at 12 in Fig. 9. The blocks and tackles may be provided with steel cables 13 or their equivalent.

The hooks 5 are permanently fastened in the net at one end and have a looped hook at the free end. To fasten two adjacent sections of the net together, the link wire 7 is merely laced through these loops and then stretched.

Cable loops 14 are permanently attached to the reenforced edges or rods on the ends of the sections for the purpose of hooking on to the blocks and tackles.

Shock absorber devices may be placed at major ground recesses, as at 15 (see Fig. 2), or other strategic points to control the period of net vibration. Steel rod stiffeners (not shown) may also be used at such points.

The mooring or anchoring devices comprising the blocks and tackles and anchors are distributed equally about the edges of the net as shown.

Various forms of equivalents may be used in place of the devices making up the landing net disclosed without departing from the general form of the assembly or the scope of this invention as defined by the appended claims.

This invention may be used by or for the United States Government without the payment to me of any royalties thereon or therefor.

What I claim is:

1. A landing net composed of a series of flexible sections flexibly joined together side edge to side edge open hooks and lacing wire or cable forming said joints and mooring means distributed equally around the outer edges of the net and fastened to suitable anchors to stretch the net over ground otherwise unsuitable for landing, the ends of said lacing wire or cable being used for a portion of the distributed mooring means.

2. A combination such as defined in claim 1 wherein the mooring means are blocks and tackles fastened to stakes driven in the ground.

3. A combination as defined in claim 1 in which the width of the sections is such that they may be easily handled when rolled up for transportation from one place to another.

4. A combination as defined in claim 1 in which the width of the sections is such that they may be easily handled when rolled up for transportation from one place to another, a reenforcing rod at each end of each section having means for hooking on to the mooring means, and reenforcing means having similar hooking means at the outer side edges of the end sections.

5. A combination as defined in claim 1 in which the width of the sections is such that they may be easily handled when rolled up for transportation from one place to another, a reenforcing rod at each end of each section having means for hooking on to the mooring means, reenforcing means having similar hooking means at the outer side edges of the end sections, hooks fastened along all the other side edges of the sections having open looped ends, and wires or cables laced through the hook loops of adjacent sections and stretched to form the flexible joints between the sections.

6. A landing net for stretching over otherwise unsuitable terrain comprising sections running across the width thereof, and having the required resiliency in this direction yet being formed of the type of flexible mesh which will make the sections adaptable for rolling up when disassembled, hooks having open looped ends fastened at intervals along adjacent edges of these sections, a wire or cable adaptable for quick lacing through these loops to join adjacent sections, rods fastened along the ends of each section and along the outer edges of the end sections, and blocks and tackles attached to these rods at intervals around the landing net and to the ends of the lacing wires or cables for connection to stakes or other anchoring means, so as to manually stretch the net with a sufficient force to provide the required resiliency in the net as a whole.

7. A landing net as defined in claim 6 with resilient members inserted between the rods and the blocks and tackles for additional resiliency.

8. A landing net as defined in claim 6 in combination with buffer means for placing under the net to support it between excessively spaced points at which it is close to the ground.

9. A landing net as defined in claim 6 in combination with buffer means for placing under the net in extensive hollows to reduce excessive spans where the net may be unreasonably spaced from the contour of the ground.

HOMER T. BOGLE.